(12) United States Patent
Koseoglu (10) Patent No.: US 11,692,139 B1
(45) Date of Patent: Jul. 4, 2023

(54) METHOD OF PRODUCING PYROLYSIS PRODUCTS FROM A MIXED PLASTICS STREAM

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/668,476

(22) Filed: Feb. 10, 2022

(51) Int. Cl.
| | |
|---|---|
| C10G 1/10 | (2006.01) |
| C10G 69/12 | (2006.01) |
| B01J 19/24 | (2006.01) |
| B01D 3/14 | (2006.01) |
| C10G 1/00 | (2006.01) |

(52) U.S. Cl.
CPC ............... C10G 1/10 (2013.01); B01D 3/143 (2013.01); B01J 19/245 (2013.01); C10G 1/002 (2013.01); C10G 69/126 (2013.01); B01J 2219/0004 (2013.01); C10G 2300/1003 (2013.01); C10G 2300/202 (2013.01); C10G 2300/205 (2013.01); C10G 2300/308 (2013.01); C10G 2300/4018 (2013.01); C10G 2300/4056 (2013.01)

(58) Field of Classification Search
CPC ........ C10G 1/10; C10G 1/002; C10G 29/126; C10G 2300/1003; C10G 2300/202; C10G 2300/205; C10G 2300/308; C10G 2300/4018; C10G 2300/4056; B01D 3/143; B01J 19/245; B01J 2219/0004
See application file for complete search history.

(56) References Cited

U.S. PATENT DOCUMENTS

| | | | |
|---|---|---|---|
| 3,074,878 | A | 1/1963 | Pappas |
| 3,492,220 | A | 1/1970 | Lempert et al. |
| 3,494,859 | A | 2/1970 | Parker |

(Continued)

FOREIGN PATENT DOCUMENTS

| | | |
|---|---|---|
| FR | 3054557 A1 | 2/2018 |
| FR | 3054558 A1 | 2/2018 |

(Continued)

OTHER PUBLICATIONS

U.S. Office Action dated Mar. 24, 2022 pertaining to U.S. Appl. No. 17/355,718, filed Jun. 23, 2021, 21 pages.

(Continued)

Primary Examiner — Thuan D Dang
(74) Attorney, Agent, or Firm — Dinsmore & Shohl LLP (57) ABSTRACT

Method of producing pyrolysis products from mixed plastics along with an associated system for processing mixed plastics. The method includes conducting pyrolysis of a plastic feedstock to produce plastic pyrolysis oil; feeding the plastic pyrolysis oil to a first fractionator to separate the plastic pyrolysis oil into a distillate fraction and a vacuum gas oil fraction; and feeding the distillate fraction to a two step oligomerization operation. The two step oligomerization operation includes feeding the distillate fraction to a first hydrotreating unit to remove di-olefins to produce a first product stream and feeding the first product stream to an olefin oligomerization reactor to react and combine mono-olefins into longer chain olefins. Such system may be integrated with a conventional refinery.

16 Claims, 4 Drawing Sheets

(56) References Cited

U.S. PATENT DOCUMENTS

| | | |
|---|---|---|
| 3,758,403 A | 9/1973 | Rosinski et al. |
| 3,894,931 A | 7/1975 | Nace et al. |
| 3,894,933 A | 7/1975 | Owen et al. |
| 3,894,934 A | 7/1975 | Owen et al. |
| 3,960,978 A | 6/1976 | Givens et al. |
| 4,419,221 A | 12/1983 | Castagnos, Jr. et al. |
| 4,980,053 A | 12/1990 | Li et al. |
| 5,216,149 A | 6/1993 | Evans et al. |
| 5,300,704 A | 4/1994 | Evans et al. |
| 5,321,174 A | 6/1994 | Evans et al. |
| 5,326,465 A | 7/1994 | Yongqing et al. |
| 5,359,061 A | 10/1994 | Evans et al. |
| 5,359,099 A | 10/1994 | Evans et al. |
| 5,386,070 A | 1/1995 | Evans et al. |
| 5,462,652 A | 10/1995 | Wegerer |
| 5,464,602 A | 11/1995 | Evans et al. |
| 5,821,553 A | 10/1998 | Evans et al. |
| 5,904,838 A | 5/1999 | Kalnes et al. |
| 6,143,940 A | 11/2000 | Miller et al. |
| 6,444,118 B1 | 9/2002 | Podrebarac et al. |
| 6,656,346 B2 | 12/2003 | Ino et al. |
| 6,822,126 B2 | 11/2004 | Miller |
| 8,277,643 B2 | 10/2012 | Huber et al. |
| 8,864,984 B2 | 10/2014 | Huber et al. |
| 9,169,442 B2 | 10/2015 | Huber et al. |
| 9,428,695 B2 | 8/2016 | Narayanaswamy et al. |
| 9,447,332 B2 | 9/2016 | Narayanaswamy et al. |
| 9,453,166 B2 | 9/2016 | Huber et al. |
| 9,458,394 B2 | 10/2016 | Dean et al. |
| 9,896,627 B2 | 2/2018 | Koseoglu |
| 10,308,896 B2 | 6/2019 | Scheibel et al. |
| 10,442,997 B2 | 10/2019 | Narayanaswamy et al. |
| 10,858,593 B2 | 12/2020 | Ramamurthy et al. |
| 10,975,313 B2 | 4/2021 | Ramamurthy et al. |
| 2003/0042175 A1 | 3/2003 | Debuisschert et al. |
| 2003/0199717 A1 | 10/2003 | Miller |
| 2003/0199718 A1 | 10/2003 | Miller |
| 2009/0151233 A1 | 6/2009 | Miller |
| 2012/0108866 A1 | 5/2012 | Grenoble et al. |
| 2016/0362609 A1 | 12/2016 | Ward et al. |
| 2017/0101592 A1 | 4/2017 | Green |
| 2018/0002609 A1 | 1/2018 | Narayanaswamy et al. |
| 2018/0023010 A1 | 1/2018 | Leflaive et al. |
| 2019/0153338 A1 | 5/2019 | Charra et al. |
| 2020/0017773 A1 | 1/2020 | Ramamurthy et al. |
| 2021/0189250 A1 | 6/2021 | Timken |

FOREIGN PATENT DOCUMENTS

| | | |
|---|---|---|
| KR | 102004522 B1 | 7/2019 |
| WO | 2021201932 A1 | 10/2021 |
| WO | WO-2022/084238 * | 4/2022 |

OTHER PUBLICATIONS

Notification of Transmittal of the International Search Report and Written Opinion of the International Searching Authority, or the Declaration dated Feb. 22, 2023 pertaining to International application No. PCT/US2022/049245 filed Nov. 8, 2022, pp. 1-13.

* cited by examiner

METHOD OF PRODUCING PYROLYSIS PRODUCTS FROM A MIXED PLASTICS STREAM

TECHNICAL FIELD

The present disclosure relates to method of producing pyrolysis products from a mixed plastics stream. In particular, certain embodiments of the disclosure relate to methods to prepare the products of plastic pyrolysis as blending stock for fuels and feedstock for chemical refining process through a specialized two step oligomerization operation.

BACKGROUND

Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Plastics pyrolyze at high temperatures and polymers can be converted back to their original monomers as gas or liquid and can be recovered. However, the additives added to the plastic during production present challenges in effectively utilizing the recovered products from pyrolysis. Upon pyrolysis, the additives end-up in the pyrolysis products.

SUMMARY

Accordingly, there is a clear and long-standing need to provide a solution to utilize the pyrolysis products generated from the pyrolysis of plastics. To utilize such pyrolysis products the residue left from the additives in the pyrolysis product must be removed or the pyrolysis products utilized in a manner that the residue is not destructive.

In accordance with one or more embodiments of the present disclosure, a method of producing pyrolysis products from a mixed plastics stream is disclosed. The method includes (a) conducting pyrolysis of a plastic feedstock to produce a stream of plastic pyrolysis oil; (b) feeding the plastic pyrolysis oil to a first fractionator to separate the plastic pyrolysis oil into a distillate fraction including hydrocarbons boiling in the range of 36 to 370° C. and a vacuum gas oil fraction comprising hydrocarbons boiling above 370° C.; and (c) feeding the distillate fraction to a two step oligomerization operation. The two step oligomerization operation includes (i) feeding the distillate fraction to a first hydrotreating unit configured and operated to remove di-olefins by hydrogenation from the distillate fraction to produce a first product stream of dediolefinized plastic pyrolysis distillate; and (ii) feeding the first product stream to an olefin oligomerization reactor configured and operated to react and combine mono-olefins in the first product stream to form longer chain olefins and produce a second product stream of oligomerized plastic pyrolysis distillate.

In some embodiments, the first fractionator further separates the distillate fraction into a plastic pyrolysis naphtha stream and a plastic pyrolysis distillate stream. Further, the first hydrotreating unit is split into a naphtha hydrotreating unit and a plastic pyrolysis distillate hydrotreating unit and the olefin oligomerization reactor is split into a naphtha oligomerization reactor and a plastic pyrolysis distillate oligomerization reactor such that the two step oligomerization operation is split into a plastic pyrolysis naphtha oligomerization operation and a plastic pyrolysis distillate oligomerization operation. The plastic pyrolysis naphtha hydrotreating operation includes (i) feeding the plastic pyrolysis naphtha stream to the naphtha hydrotreating unit configured and operated to remove di-olefins by hydrogenation from the plastic pyrolysis naphtha stream to produce a first naphtha product stream of dediolefinized plastic pyrolysis naphtha; and (ii) feeding the first naphtha product stream to the naphtha oligomerization reactor configured and operated to react and combine mono-olefins from the first naphtha product stream to form longer chain olefins and produce a second naphtha product stream of oligomerized plastic pyrolysis naphtha. The plastic pyrolysis distillate hydrotreating operation includes (i) feeding the plastic pyrolysis distillate fraction to the plastic pyrolysis distillate hydrotreating unit configured and operated to remove di-olefins by hydrogenation from the plastic pyrolysis distillate stream to produce a first plastic pyrolysis distillate product stream of dediolefinized plastic pyrolysis distillate; and (ii) feeding the first plastic pyrolysis distillate product stream to the plastic pyrolysis distillate oligomerization reactor configured and operated to react and combine mono-olefins from the first plastic pyrolysis distillate product stream to form longer chain olefins and produce a second plastic pyrolysis distillate product stream of oligomerized plastic pyrolysis distillate.

In accordance with one or more embodiments of the present disclosure, a system for processing mixed plastics into plastic pyrolysis products. The system includes an inlet stream comprising mixed plastics; a plastic pyrolysis unit, the plastic pyrolysis unit in fluid communication with the inlet stream, and operable generate a stream of plastic pyrolysis oil from the inlet stream; a first fractionator, the first fractionator in fluid communication with the plastic pyrolysis unit and operable to separate the stream of plastic pyrolysis oil into a distillate fraction including hydrocarbons boiling in the range of 36 to 370° C. and a vacuum gas oil fraction comprising hydrocarbons boiling above 370° C.; a first hydrotreating unit, the first hydrotreating unit in fluid communication with the first fractionator and operable to remove di-olefins by hydrogenation from the distillate fraction provided from the first fractionator to produce a first product stream of dediolefinized plastic pyrolysis distillate; and an olefin oligomerization reactor, the olefin oligomerization reactor in fluid communication with the first hydrotreating unit and operable to react and combine mono-olefins from the first product stream provided from the first hydrotreating unit to form longer chain olefins and produce a second product stream of oligomerized plastic pyrolysis distillate.

In some embodiments, the first hydrotreating unit is split into a naphtha hydrotreating unit and a plastic pyrolysis distillate hydrotreating unit and the olefin oligomerization reactor is split into a naphtha oligomerization reactor and a plastic pyrolysis distillate oligomerization reactor, where the naphtha hydrotreating unit is in fluid communication with the first fractionator and operable to remove di-olefins by hydrogenation from the plastic pyrolysis naphtha stream provided from the first fractionator to produce a first naphtha product stream of dediolefinized plastic pyrolysis naphtha; the plastic pyrolysis distillate hydrotreating unit is in fluid communication with the first fractionator and operable to remove di-olefins by hydrogenation from the plastic pyrolysis distillate stream provided from the first fractionator to produce a first plastic pyrolysis distillate product stream of dediolefinized plastic pyrolysis distillate; the naphtha oligomerization reactor is in fluid communication with the naphtha hydrotreating unit and operable to react and combine mono-olefins from the first naphtha product stream provided from the naphtha hydrotreating unit to form longer chain olefins and produce a second naphtha product stream of oligomerized plastic pyrolysis naphtha; and the plastic pyrolysis distillate oligomerization reactor is in fluid communication with the plastic pyrolysis distillate hydrotreating unit and operable to react and combine mono-olefins from the first plastic pyrolysis distillate product stream provided from the plastic pyrolysis distillate hydrotreating unit to form longer chain olefins and produce a second plastic pyrolysis distillate product stream of olefinized plastic pyrolysis distillate.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar units.

DETAILED DESCRIPTION

Embodiments of systems and associated methods for producing pyrolysis products from a mixed plastics stream are provided in the present disclosure.

A system for processing mixed plastics into plastic pyrolysis products includes an inlet stream comprising mixed plastics, a plastic pyrolysis unit, a first fractionator, and a two part oligomerization unit. The two part oligomerization unit comprises a first hydrotreating unit, and an olefin oligomerization reactor. The plastic pyrolysis unit is operable to generate a stream of plastic pyrolysis oil from the inlet stream. The first fractionator is operable to separate the stream of plastic pyrolysis oil into a distillate fraction including hydrocarbons boiling range hydrocarbons and a vacuum gas oil fraction. Further, the first hydrotreating unit is operable to remove di-olefins from the distillate fraction to produce a first product stream. The olefin oligomerization reactor is operable to react and combine mono-olefins from the first product stream to form longer chain olefins and produce a second product stream of oligomerized plastic pyrolysis distillate.

A system for processing mixed plastics into plastic pyrolysis products may also include an arrangement where the first fractionator is further operable to separate the distillate fraction into a plastic pyrolysis naphtha stream comprising hydrocarbons and a plastic pyrolysis distillate stream. In such arrangement, the first hydrotreating unit is split into a naphtha hydrotreating unit and a plastic pyrolysis distillate hydrotreating unit and the olefin oligomerization reactor is split into a naphtha oligomerization reactor and a plastic pyrolysis distillate oligomerization reactor. The naphtha hydrotreating unit and the naphtha oligomerization reactor process the plastic pyrolysis naphtha stream. Similarly, the plastic pyrolysis distillate hydrotreating unit and the plastic pyrolysis distillate oligomerization reactor process the plastic pyrolysis distillate stream.

The associated method of producing pyrolysis products from a mixed plastics stream includes conducting pyrolysis of a plastic feedstock to produce a stream of plastic pyrolysis oil, feeding the plastic pyrolysis oil to a first fractionator to separate the plastic pyrolysis oil into a distillate fraction including hydrocarbons boiling range hydrocarbons and a vacuum gas oil fraction, and feeding the distillate fraction to a two step oligomerization operation. The two step oligomerization operation includes feeding the distillate fraction to a first hydrotreating unit to remove di-olefins to produce a first product stream and then feeding the first product stream to an olefin oligomerization reactor to react and combine mono-olefins to form longer chain olefins and produce a second product stream of oligomerized plastic pyrolysis distillate.

The associated method of producing pyrolysis products from a mixed plastics stream may also include separating the distillate fraction into a plastic pyrolysis naphtha stream and a plastic pyrolysis distillate stream in the first fractionator. With separate plastic pyrolysis naphtha and plastic pyrolysis distillate streams the first hydrotreating unit is split into a naphtha hydrotreating unit and a plastic pyrolysis distillate hydrotreating unit and the two step oligomerization operation is split into a plastic pyrolysis naphtha oligomerization operation and a plastic pyrolysis distillate oligomerization operation. The plastic pyrolysis naphtha hydrotreating operation includes serially feeding the plastic pyrolysis naphtha stream to the naphtha hydrotreating unit to remove di-olefins and the naphtha oligomerization reactor to react and combine mono-olefins to form longer chain olefins. The plastic pyrolysis distillate hydrotreating operation includes serially feeding the plastic pyrolysis distillate fraction to the plastic pyrolysis distillate hydrotreating unit to remove di-olefins and the plastic pyrolysis distillate oligomerization reactor to react and combine mono-olefins to form longer chain olefins.

Having generally described the system and associated methods of producing pyrolysis products from a mixed plastics stream, embodiments of the same are described in further detail and with reference to the various Figures.

Figure 1:
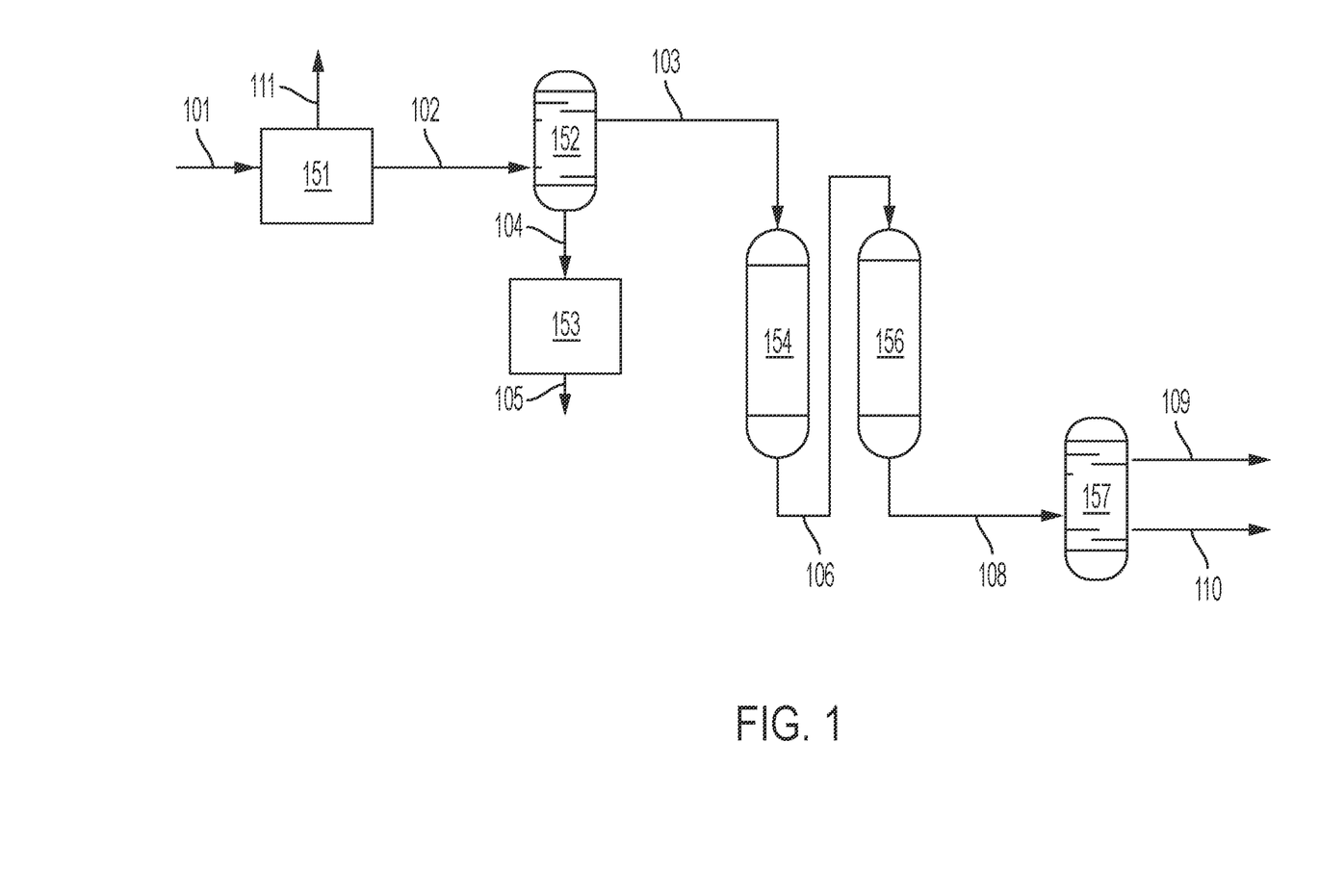
FIG. 1 is a schematic illustration of one or more embodiments of the present disclosure, in which a distillate fraction which includes hydrocarbons boiling in the range of 36 to 370° C. fractionated from plastic pyrolysis oil produced in the pyrolysis of a plastic feedstock is fed to a unitary two step oligomerization operation.

Referring first to FIG. 1, a schematic illustration of one or more embodiments of the present disclosure in which a distillate fraction which includes hydrocarbons boiling in the range of 36 to 370° C. fractionated from plastic pyrolysis oil produced in the pyrolysis of a plastic feedstock is fed to a unitary two step oligomerization operation is presented. An inlet stream 101 comprising mixed plastics is provided to a plastic pyrolysis unit 151. The plastic pyrolysis unit 151 is in fluid communication with the inlet stream 101 and is operable to generate a stream of plastic pyrolysis oil 102 from the inlet stream 101. A first fractionator 152 is in fluid communication with the plastic pyrolysis unit 151 and is operable to separate the stream of plastic pyrolysis oil 102 into a distillate fraction 103 including hydrocarbons boiling in the range of 36 to 370° C. and a vacuum gas oil fraction 104 comprising hydrocarbons boiling above 370° C. Further, a first hydrotreating unit 154 is in fluid communication with the first fractionator 152 and is operable to remove di-olefins from the distillate fraction 103 to produce a first product stream 106 of dediolefinized plastic pyrolysis distillate. Additionally, an olefin oligomerization reactor 156 is in fluid communication with the first hydrotreating unit 154 and is operable to react and combine mono-olefins in the first product stream 106 to form longer chain olefins and produce a second product stream 108 of oligomerized plastic pyrolysis distillate.

Plastic Feedstock

In one or more embodiments, the inlet stream 101 comprises a plastic feedstock including mixed plastics of differing compositions. The plastic feedstock provided to the plastic pyrolysis unit 151 may be a mixture of plastics from various polymer families. In various embodiments, the plastic feedstock may comprise plastics representative of one or more of the polymer families disclosed in Table 1. Specifically, the plastic feedstock may comprise plastics representative of one or more of olefins, carbonates, aromatic polymers, sulfones, fluorinated hydrocarbon polymers, chlorinated hydrocarbon polymers, and acrylonitriles. Further, the plastic feedstock provided to the plastic pyrolysis unit 151 may be a mixture of high density polyethylene (HIDPE, for example, a density of about 0.93 to 0.97 grains per cubic centimeter (g/cm$^3$), low density polyethylene (LDPE, for example, about 0.910 g/cm$^3$ to 0.940 g/cm$^3$), polypropylene (PP), linear low density polyethylene (LL-DPE), polystyrene (PS), polyethylene terephthalate (PET). It will be appreciated that utilization of the mixed plastics feedstock allows for recycling of plastics without necessitating fine sorting of the plastics.

TABLE 1

Example Polymers

| Polymer family | Example polymer | Melting Point, ° C. | Structure |
|---|---|---|---|
| Olefins | Polyethylene (PE) | 115-135 | (structure shown) |
| Olefins | Polypropylene (PP) | 115-135 | (structure shown) |
| carbonates | diphenylcarbonate | 83 | (structure shown) |
| aromatics | Polystyrene (PS) | 240 | (structure shown) |
| Sulfones | Polyether sulfone | 227-238 | (structure shown) |

TABLE 1-continued

Example Polymers

| Polymer family | Example polymer | Melting Point, °C. | Structure |
|---|---|---|---|
| Fluorinated hydrocarbons | Polytetrafluoroethylene (PTFE) | 327 | $\left(\begin{array}{cc} F & F \\ | & | \\ C-C \\ | & | \\ F & F \end{array}\right)_n$ |
| Chlorinated hydrocarbons | Polyvinyl chloride (PVC) | 100-260 | $\left[\begin{array}{cc} H & Cl \\ | & | \\ C-C \\ | & | \\ H & H \end{array}\right]_n$ |
| Acyrilnitriles | Polyacrylonitrile (PAN) | 300 | |

The plastics of the inlet stream 101 may be provided in a variety of different forms. The plastics may be in the form of a powder in smaller scale operations. The plastics may be in the form of pellets, such as those with a particle size of from 1 to 5 millimeter (mm) for larger scale operations. In further embodiments, the plastics may be provided as a chopped or ground product. Further, the plastics of the inlet stream 101 may be natural, synthetic or semi-synthetic polymers. In various embodiments, the plastics of the inlet stream 101 may comprise waste plastic, manufacturing off-spec product, new plastic products, unused plastic products, as well as their combinations.

Plastic Pyrolysis

The plastic pyrolysis unit 151 converts the inlet stream 101 of plastics to gaseous and liquid products. The liquid products are provided as an effluent from the plastic pyrolysis unit 151 as the stream of plastic pyrolysis oil 102. The stream of gaseous products are generically shown in FIGS. 1 and 2 as off-gas stream 111. The gaseous products in the off-gas stream 111 may include various species such as hydrogen and hydrocarbon gases (C1-C4), carbon monoxide (CO), carbon dioxide ($CO_2$), and other acid gases.

The specific reactor used as the plastic pyrolysis unit 151 can be of different types and are not limited for the purposes of the present disclosure. One skilled in the art will appreciate that typical reactor types that can be used to serve the function of the plastic pyrolysis unit 151 are tank reactors, rotary kilns, packed beds, bubbling and circulating fluidized bed and others. In one or more embodiments, the pyrolysis of the plastic feedstock in the inlet stream 101 is performed in the presence or absence of a catalyst at a temperature of 300 to 1000° C. In various further embodiments, the plastic pyrolysis unit 151 may operate at a low severity at a temperature less than or equal to 450° C., at a high severity at a temperature greater than 450° C., at a temperature of 300 to 450° C., at a temperature of 450 to 1000° C., at a temperature of 450 to 750° C., at a temperature of 600 to 1000° C., or at a temperature of 750 to 1000° C. In various embodiments, the plastic pyrolysis unit 151 may operate at a pressure in the range of 1 to 100 bars, 1 to 50 bars, 1 to 25 bars, or 1 to 10 bars. Further, in various embodiments, the residence time of the plastic feedstock in the plastic pyrolysis unit 151 may be 1 to 3600 seconds, 60 to 1800 seconds, or 60 to 900 seconds.

In one or more embodiments, stream of plastic pyrolysis oil 102 exiting the plastic pyrolysis unit 151 may be mixed with refinery fractions. Specifically, the composition of plastic oil in the stream of plastic pyrolysis oil 102 as fed to the first fractionator 152 may vary from 0.1 weight percent (wt. %) to 100 wt. % with the remainder comprising conventional refinery streams. In various embodiments, the composition of plastic oil in the stream of plastic pyrolysis oil 102 as fed to the first fractionator 152 may comprise 0.1 to 100 wt. % plastic oil, 20 to 100 wt. % plastic oil, 40 to 100 wt. % plastic oil, 60 to 100 wt. % plastic oil, 80 to 100 wt. % plastic oil, or substantially 100 wt. % plastic oil.

First Fractionator

The first fractionator 152 may comprise any unit operation or system known to those skilled in the art for separating a hydrocarbon stream by vapor pressure. An example fractionation unit is an atmospheric distillation unit. An atmospheric distillation unit utilizes fractional distillation by heating the feed to a temperature at which one or more fractions of the mixture will vaporize while leaving other fractions as liquid to separate the feed stream. Further, in various embodiments, the first fractionator 152 may be a simple flash column or true boiling point distillation with at least 15 theoretical plates. In one or more embodiments, the first fractionator 152 separates the stream of plastic pyrolysis oil 102 into a distillate fraction 103 including hydrocarbons boiling in the range of 36 to 370° C. and a vacuum gas oil fraction 104 comprising hydrocarbons boiling above 370° C.

It is noted that when the plastic feedstock includes polymers that contain sulfur, chlorine, or fluorine, treatment of the plastic pyrolysis oil 102 may be desirable before hydrotreating to remove such heteroatoms. The pretreatment may be completed before or after the first fractionator 152.

Two Step Oligomerization Operation

The first hydrotreating unit 154 is in fluid communication with the first fractionator 152 and is operable to remove di-olefins by hydrogenation from the distillate fraction 103 to produce the first product stream 106. The first product stream 106 is dediolefinized plastic pyrolysis distillate. It will be appreciated that in one or more embodiments di-olefins are removed completely from the distillate fraction 103. For purposes of the present disclosure the term "removed completely" means di-olefins were reduced to less than 1 weight percent, less than 0.1 weight percent, less than 0.01 weight percent, or less than 0.001 weight percent.

In one or more embodiments, the first hydrotreating unit 154 may be a fixed bed reactor in combination with any known hydrogenation catalyst. However, the first hydrotreating unit 154 is not intended to be limited to any specific type of reactor.

In one or more embodiments, the first hydrotreating unit 154 includes a first hydrogenation catalyst. The first hydrogenation catalyst may comprise a nickel catalyst on one or more of an alumina support, a silica support, and a titania support. For example, the first hydrogenation catalyst may comprise nickel catalyst on an alumina support or nickel-molybdenum (Ni—Mo) catalyst in an alumina support.

In one or more embodiments, the first hydrotreating unit 154 is operated at a temperature of 150 to 210° C. In various further embodiments, the first hydrotreating unit 154 is operated at a temperature of 150 to 200° C., 150 to 190° C., 150 to 180° C., or approximately 170° C.

In one or more embodiments, the first hydrotreating unit 154 is operated at a hydrogen pressure at the inlet of 10 to 25 bar. In various further embodiments, the first hydrotreating unit 154 is operated at a hydrogen pressure at the inlet of 10 to 25 bar, 10 to 20 bar, 12 to 18 bar, or approximately 15 bar.

In one or more embodiments, the first hydrotreating unit 154 is operated at a liquid hourly space velocity (LHSV) of 1 to 5 inverse hours (h). In various further embodiments, the first hydrotreating unit 154 is operated at an LHSV of 1 to 4 $h^{-1}$, 1 to 3 $h^{-1}$, or approximately 2 $h^{-1}$.

In one or more embodiments, the first hydrotreating unit 154 is operated at a hydrogen recycle rate of 50 to 300 standard cubic meters per cubic meter ($Sm^3/m^3$). One skilled in the art will appreciate that standard cubic meters are measured at a temperature of 15° C. and pressure of 1.01325 bar. In various further embodiments, the first hydrotreating unit 154 is operated at a hydrogen recycle rate of 50 to 250 $Sm^3/m^3$, 50 to 180 $Sm^3/m^3$, 50 to 100 $Sm^3/m^3$, or 50 to 75 $Sm^3/m^3$.

The olefin oligomerization reactor 156 is in fluid communication with the first hydrotreating unit 154 and is operable to react and combine mono-olefins in the first product stream 106 to form longer chain olefins and produce a second product stream 108. The second product stream 108 is oligomerized plastic pyrolysis distillate.

In one or more embodiments, the olefin oligomerization reactor 156 may be any of a variety of processes available to oligomerize olefins. Example olefin oligomerization processes are provided infra but it is noted that olefin oligomerization reactor 156 is not intended to be limited to any specific type of reactor or process and is open to any system known to those skilled in the art.

An example oligomerization process which may be implemented as the olefin oligomerization reactor 156 in accordance with one or more embodiments of the present disclosure includes a process for oligomerization of propylene, butene or a mixture of both. Such process utilizes a phosphoric acid catalyst laid down on a solid support of the kieselguhr type. The process involves a reactor where the catalyst is divided up into several beds. The resulting oligomerization reactions are exothermic and quenches are used to cool the reactants, products, or both in the reactor. It is noted that cold propane may be utilized as the quenching fluid and injected to the reactors at each bed. Finally, the products may be sent to a stabilization column to remove excess C3/C4 to generate a final product stream of gasoline at 90-95 wt. % levels. As such, the process produces a gasoline with 92-94 research octane number (RON) from C3-C4 feedstocks.

A further example oligomerization process which may be implemented as the olefin oligomerization reactor 156 in accordance with one or more embodiments of the present disclosure converts C3-C10 olefins into gasoline blending components. Such process uses silica-alumina type zeolitic catalysts in two reactors in series with a heat exchanger positioned between the reactors. The product is cooled in a heat exchanger and then separated into gas and liquid fractions with the liquid further separated into gasoline and gas oil. The process conversion is 95-98 wt. %.

Yet a further example oligomerization process which may be implemented as the olefin oligomerization reactor 156 in accordance with one or more embodiments of the present disclosure utilizes an organic nickel compound to oligomerize olefins. The catalyst is injected continuously to the reactor and then rejected by the system with ammonia injection and caustic washing. The resulting product is then stabilized in a column to produce a gasoline with 96 RON.

A further example oligomerization process which may be implemented as the olefin oligomerization reactor 156 in accordance with one or more embodiments of the present disclosure converts C5-C10 olefins over ZSM-5 catalyst into gasoline blending components with a 90 RON number and higher. The process uses four reactors in series with heat exchanger in between each to cool the reactor effluents. In one or more embodiments, the reactors may be designed and operated in a manner such that three reactors are in operation while one undergoes regeneration.

In one or more embodiments, the olefin oligomerization reactor 156 includes a zeolite catalyst. The zeolite catalyst may comprise zeolite framework types selected from FAU, BEA, MOR, MFI, sulfated zirconia, and MCM type zeolites such as MCM-41 and MCM-48. The zeolite may be utilized unmodified or post modified by dealumination and insertion of new transition metal in accordance with various embodiments. Further, in various embodiments, the zeolite catalyst comprises from 1 wt. % to 80 wt. % zeolite, from 5 wt. % to 75 wt. % zeolite, from 10 wt. % to 70 wt. % zeolite, from 20 wt. % to 60 wt. % zeolite, or from 30 wt. % to 50 wt. % zeolite.

In one or more embodiments, the olefin oligomerization reactor 156 is operated at a temperature of 80 to 300° C. In various further embodiments, the olefin oligomerization reactor 156 is operated at a temperature of 80 to 285° C., 80 to 275° C., 80 to 240° C., or 100 to 240° C. It will be appreciated that as the zeolite content of the catalyst is increased, the required processing temperature may decrease.

In one or more embodiments, the olefin oligomerization reactor 156 is operated at a hydrogen pressure at the inlet of 5 to 100 bar. In various further embodiments, the olefin oligomerization reactor 156 is operated at a hydrogen pressure at the inlet of 5 to 80 bar, 20 to 70 bar, 40 to 70 bar, or approximately 60 bar.

In one or more embodiments, the olefin oligomerization reactor 156 is operated at a LI ISV of 0.2 to 5 $h^{-1}$. In various further embodiments, the olefin oligomerization reactor 156 is operated at an LHSV of 0.5 to 3 $h^{-1}$, 1 to 2 $h^{-1}$, or approximately 1.5 $h^{-1}$.

In one or more embodiments, the second product stream 108 is provided to a second fractionator 157 to generate a gasoline blending stream 109 and a distillate blending stream 110 based on fractionation at a hydrocarbon boiling point of 110 to 180° C. In various further embodiments, the gasoline blending stream 109 and the distillate blending stream 110 are generated based on fractionation at a hydrocarbon boiling point of 170 to 200° C., 160 to 190° C., 170 to 190° C., or approximately 180° C. The second fractionator 157 may comprise any unit operation or system known to those skilled in the art for separating a hydrocarbon stream by vapor pressure.

In one or more embodiments, the second fractionator 157 may generate the gasoline blending stream 109 and the distillate blending stream 110 as well as an optional heavies product stream (not shown). The heavies product stream may comprise the molecules heavier than the diesel range with a hydrocarbon boiling point of greater than 370° C. or may be included with the distillate blending stream 110. Specifically, the second fractionator 157 may generate the gasoline blending stream 109 based on fractionation at a hydrocarbon boiling point of 110 to 180° C. the heavies product stream based on fractionation at a hydrocarbon boiling point range greater than 370° C., and the distillate blending stream 110 formed from hydrocarbons of the intermediate boiling points. In various further embodiments, the gasoline blending stream 109 and the distillate blending stream 110 are separated based on fractionation at a hydrocarbon boiling point of 170 to 200° C., 160 to 190° C., 170 to 190° C., or approximately 180° C. and the distillate blending stream 110 and the heavies product stream are separated based on fractionation at a hydrocarbon boiling point of approximately 370° C.

In further embodiments, the second fractionator 157 may split the second product stream 102 into the gasoline blending stream 109 based on fractionation at a hydrocarbon boiling point of 80 to 180° C., the heavies product stream based on fractionation at a hydrocarbon boiling point range greater than 370° C. and the distillate blending stream 110 formed from hydrocarbons of the intermediate boiling points. In various further embodiments, the gasoline blending stream 109 and the distillate blending stream 110 are separated based on fractionation at a hydrocarbon boiling point of 80 to 90° C. commensurate with C6 naphtha, 110 to 120° C. commensurate with C7 naphtha, 135 to 145° C. commensurate with C8 naphtha, approximately 85° C., approximately 116° C., or approximately 140° C. and the distillate blending stream 110 and the heavies product stream are separated based on fractionation at a hydrocarbon boiling point of 370° C.

Figure 2:
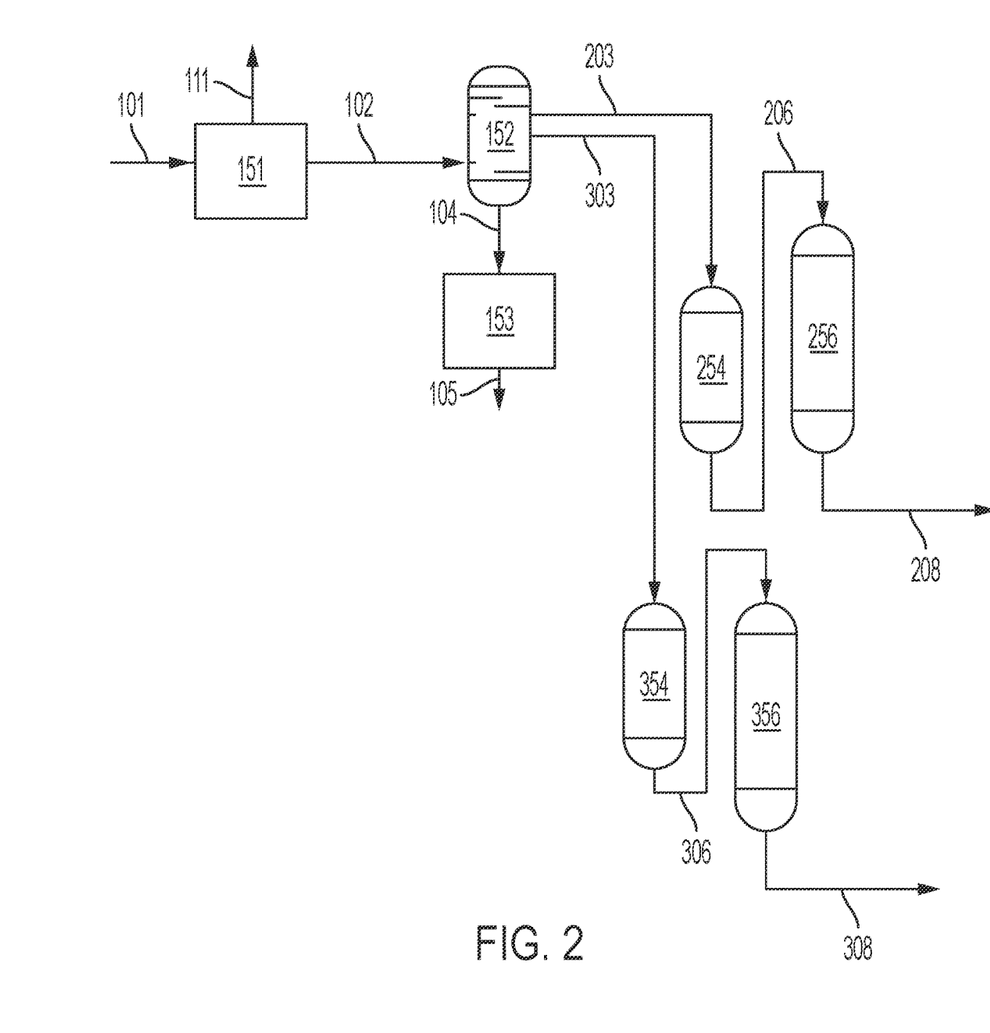
FIG. 2 is a schematic illustration of one or more embodiments of the present disclosure, in which a distillate fraction fractionated from plastic pyrolysis oil produced in the pyrolysis of a plastic feedstock is separated into a plastic pyrolysis naphtha stream and a plastic pyrolysis distillate stream with each separately fed to a distinct two step oligomerization operation.

Referring now to FIG. 2, a schematic illustration of one or more embodiments of the present disclosure in which a plastic pyrolysis naphtha stream and a plastic pyrolysis distillate stream are fractionated from the plastic pyrolysis oil produced in the pyrolysis of a plastic feedstock with each of the plastic pyrolysis naphtha stream and the plastic pyrolysis distillate stream fed to a distinct two step oligomerization operation is presented.

In one or more embodiments, the inlet stream 101 comprising mixed plastics is provided to the plastic pyrolysis unit 151. The plastic pyrolysis unit 151 is in fluid communication with the inlet stream 101 and is operable to generate the stream of plastic pyrolysis oil 102 from the inlet stream 101. The first fractionator 152 is in fluid communication with the plastic pyrolysis unit 151 and is operable to separate the stream of plastic pyrolysis oil 102 into a plastic pyrolysis naphtha stream 203 comprising hydrocarbons boiling in the range of 30 to 110° C., a plastic pyrolysis distillate stream 303 comprising hydrocarbons boiling in the range of 110 to 370° C., and the vacuum gas oil fraction 104 comprising hydrocarbons boiling above 370° C. In such arrangement the plastic pyrolysis naphtha stream 203 is provided to a dedicated two step oligomerization operation and the plastic pyrolysis distillate stream 303 is provided to a separate dedicated two step oligomerization unit. In various further embodiments, the split between the plastic pyrolysis naphtha stream 203 and the plastic pyrolysis distillate stream 303 is generated based on fractionation at a hydrocarbon boiling point of 85 to 220° C., 100 to 180° C., 100 to 160° C., or 100 to 120° C.

The plastic pyrolysis naphtha stream 203 is processed with a naphtha hydrotreating unit 254 and a naphtha oligomerization reactor 256. The naphtha hydrotreating unit 254 is in fluid communication with the first fractionator 152 and operable to remove di-olefins by hydrogenation from the plastic pyrolysis naphtha stream 203 provided from the first fractionator 152 to produce a first naphtha product stream 206 of dediolefinized plastic pyrolysis naphtha. The naphtha oligomerization reactor 256 is in fluid communication with the naphtha hydrotreating unit 254 and operable to react and combine mono-olefins from the first naphtha product stream 206 provided from the naphtha hydrotreating unit 254 to form longer chain olefins and produce a second naphtha product stream 208 of oligomerized plastic pyrolysis naphtha.

In one or more embodiments, the naphtha hydrotreating unit 254 may have the same configuration and operating parameters as the first hydrotreating unit 154. Specifically, the naphtha hydrotreating unit 254 may be a fixed bed reactor in combination with any known hydrogenation catalyst, although the naphtha hydrotreating unit 254 is not intended to be limited to any specific type of reactor. Further, the operating parameters including operating temperature, hydrogen pressure at inlet, LHSV, and the hydrogen recycle rate as disclosed with regards to the first hydrotreating unit 154 are transferable to the naphtha hydrotreating unit 254.

In one or more embodiments, di-olefins are removed completely from the plastic pyrolysis naphtha stream 203 in the naphtha hydrotreating unit 254. For purposes of the present disclosure the term "removed completely" means di-olefins were reduced to less than 1 weight percent, less than 0.1 weight percent, less than 0.01 weight percent, or less than 0.001 weight percent.

In one or more embodiments, the naphtha hydrotreating unit 254 may include the first hydrogenation catalyst. As indicated with respect to the first hydrotreating unit 154, the first hydrogenation catalyst may comprise a nickel catalyst on one or more of an alumina support, a silica support, and a titania support such as a nickel catalyst on an alumina support or nickel-molybdenum (Ni—Mo) catalyst in an alumina support.

In one or more embodiments, the naphtha oligomerization reactor 256 may have the same configuration and operating parameters as the olefin oligomerization reactor 156. Further, many of the operating parameters including operating temperature. LHSV, and the hydrogen recycle rate as disclosed with regards to the olefin oligomerization reactor 156 are transferable to the naphtha oligomerization reactor 256.

In one or more embodiments, the naphtha oligomerization reactor 256 includes a zeolite catalyst. As indicated with respect to the oligomerization reactor 156, the zeolite catalyst may comprise zeolite framework types selected from FAU, BEA, MOR, MFI, sulfated zirconia, and MCM type zeolites such as MCM-41 and MCM-48. The zeolite may be utilized unmodified or post modified by dealumination and insertion of new transition metal in accordance with various embodiments. Further, in various embodiments, the zeolite catalyst comprises from 1 wt. % to 80 wt. % zeolite, from 5 wt. % to 75 wt. % zeolite, from 10 wt. % to 70 wt. % zeolite, from 20 wt. % to 60 wt. % zeolite, or from 30 wt. % to 50 wt. % zeolite.

Figure 4:
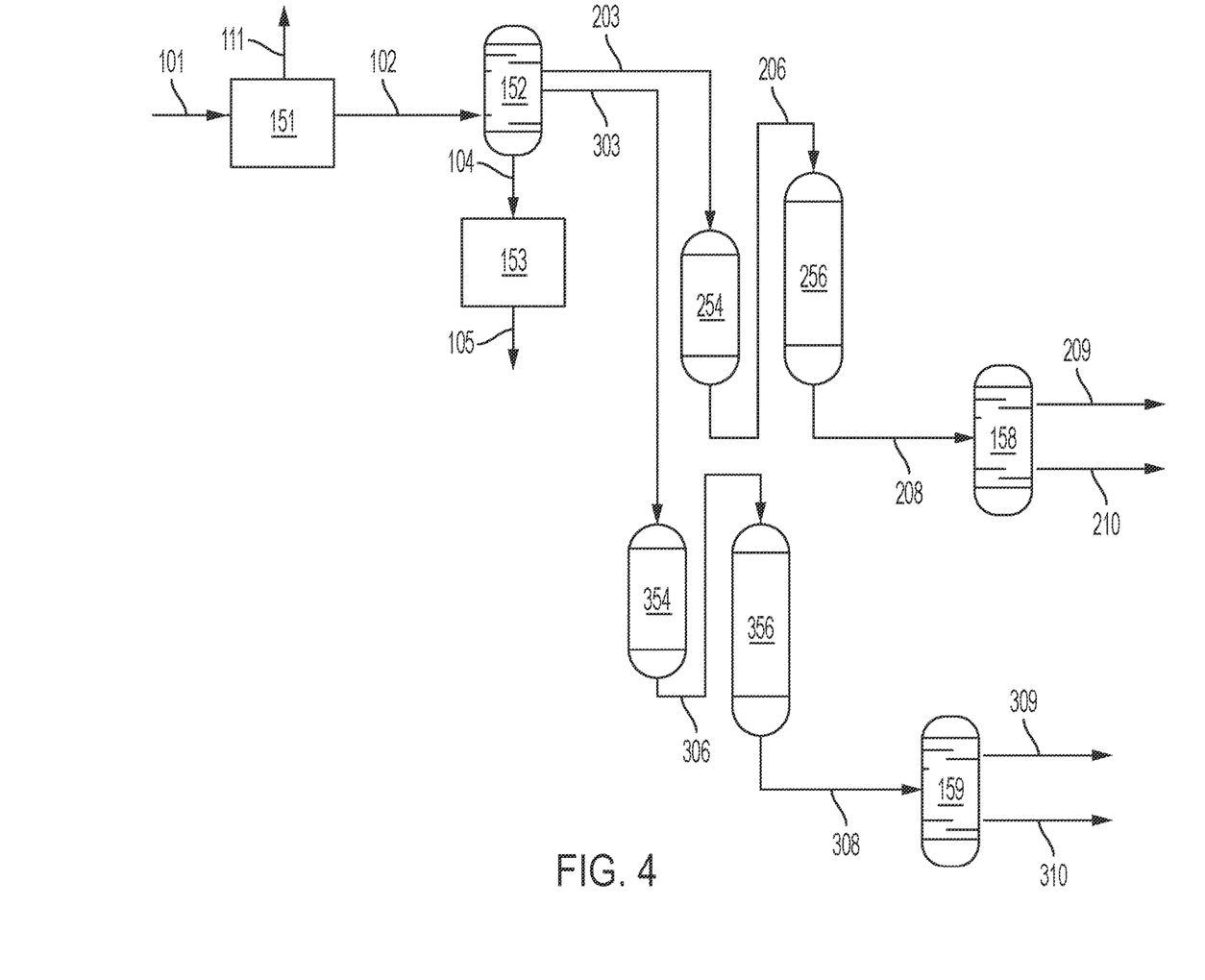
FIG. 4 is a schematic illustration of an embodiment of the present disclosure, in which a pretreater is utilized to remove contaminants from plastic pyrolysis oil prior to further processing.

In one or more embodiments and with reference to FIG. 4, a third fractionator 158 may split the second naphtha product stream 208 of oligomerized plastic pyrolysis distillate produced in the naphtha oligomerization reactor 256 to generate a naphtha gasoline product stream 209 and a naphtha distillate product stream 210. The boiling point split between fractions may align with those disclosed with regards to the product streams of the second fractionator 157 with the gasoline blending stream 109 corresponding with the naphtha gasoline product stream 209 and the distillate blending stream 110 corresponding with the naphtha distillate product stream 210.

The plastic pyrolysis distillate stream 303 is processed with a plastic pyrolysis distillate hydrotreating unit 354 and a plastic pyrolysis distillate oligomerization reactor 356. The plastic pyrolysis distillate hydrotreating unit 354 is in fluid communication with the first fractionator 152 and operable to remove di-olefins by hydrogenation from the plastic pyrolysis distillate stream 303 provided from the first fractionator 152 to produce a first plastic pyrolysis distillate product stream 306 of dediolefinized plastic pyrolysis distillate. The plastic pyrolysis distillate oligomerization reactor 356 is in fluid communication with the plastic pyrolysis distillate hydrotreating unit 354 and operable to react and combine mono-olefins from the first plastic pyrolysis distillate product stream 306 provided from the plastic pyrolysis distillate hydrotreating unit 354 to form longer chain olefins and produce a second plastic pyrolysis distillate product stream 308 of oligomerized plastic pyrolysis distillate.

In one or more embodiments, the plastic pyrolysis distillate hydrotreating unit 354 may have the same configuration and operating parameters as the first hydrotreating unit 154. Specifically, the plastic pyrolysis distillate hydrotreating unit 354 may be a fixed bed reactor in combination with any known hydrogenation catalyst, although the plastic pyrolysis distillate hydrotreating unit 354 is not intended to be limited to any specific type of reactor. Further, the operating parameters including operating temperature, hydrogen pressure at inlet, LHSV, and the hydrogen recycle rate as disclosed with regards to the first hydrotreating unit 154 are transferable to the plastic pyrolysis distillate hydrotreating unit 354.

In one or more embodiments, di-olefins are removed completely from the plastic pyrolysis distillate stream 303 in the plastic pyrolysis distillate hydrotreating unit 354. For purposes of the present disclosure the term "removed completely" means di-olefins were reduced to less than 1 weight percent, less than 0.1 weight percent, less than 0.01 weight percent, or less than 0.001 weight percent.

In one or more embodiments, the plastic pyrolysis distillate hydrotreating unit 354 may include the first hydrogenation catalyst. As indicated with respect to the first hydrotreating unit 154, the first hydrogenation catalyst may comprise a nickel catalyst on one or more of an alumina support, a silica support, and a titania support such as a nickel catalyst on an alumina support.

In one or more embodiments, the plastic pyrolysis distillate oligomerization reactor 356 may have the same configuration and operating parameters as the olefin oligomerization reactor 156. Further, many of the operating parameters including operating temperature, LHSV, and the hydrogen recycle rate as disclosed with regards to the olefin oligomerization reactor 156 are transferable to the plastic pyrolysis distillate oligomerization reactor 356.

In one or more embodiments, the plastic pyrolysis distillate oligomerization reactor 356 includes a zeolite catalyst. As indicated with respect to the oligomerization reactor 156, the zeolite catalyst may comprise zeolite framework types selected from FAU, BEA, MOR, MFI, sulfated zirconia, and MCM type zeolites such as MCM-41 and MCM-48. The zeolite may be utilized unmodified or post modified by dealumination and insertion of new transition metal in accordance with various embodiments. Further, in various embodiments, the zeolite catalyst comprises from 1 wt. % to 80 wt. % zeolite, from 5 wt. % to 75 wt. % zeolite, from 10 wt. % to 70 wt. % zeolite, from 20 wt. % to 60 wt. % zeolite, or from 30 wt. % to 50 wt. % zeolite.

In one or more embodiments and with reference to FIG. 4, a fourth fractionator 159 may split the second plastic pyrolysis distillate product stream 308 of oligomerized plastic pyrolysis distillate produced in the plastic pyrolysis distillate oligomerization reactor 356 to generate a light distillate product stream 309 and a heavy distillate product stream 310. The heavy distillate product stream 310 may comprise the molecules heavier than the diesel range with a hydrocarbon boiling point of greater than 370° C.

Figure 3:
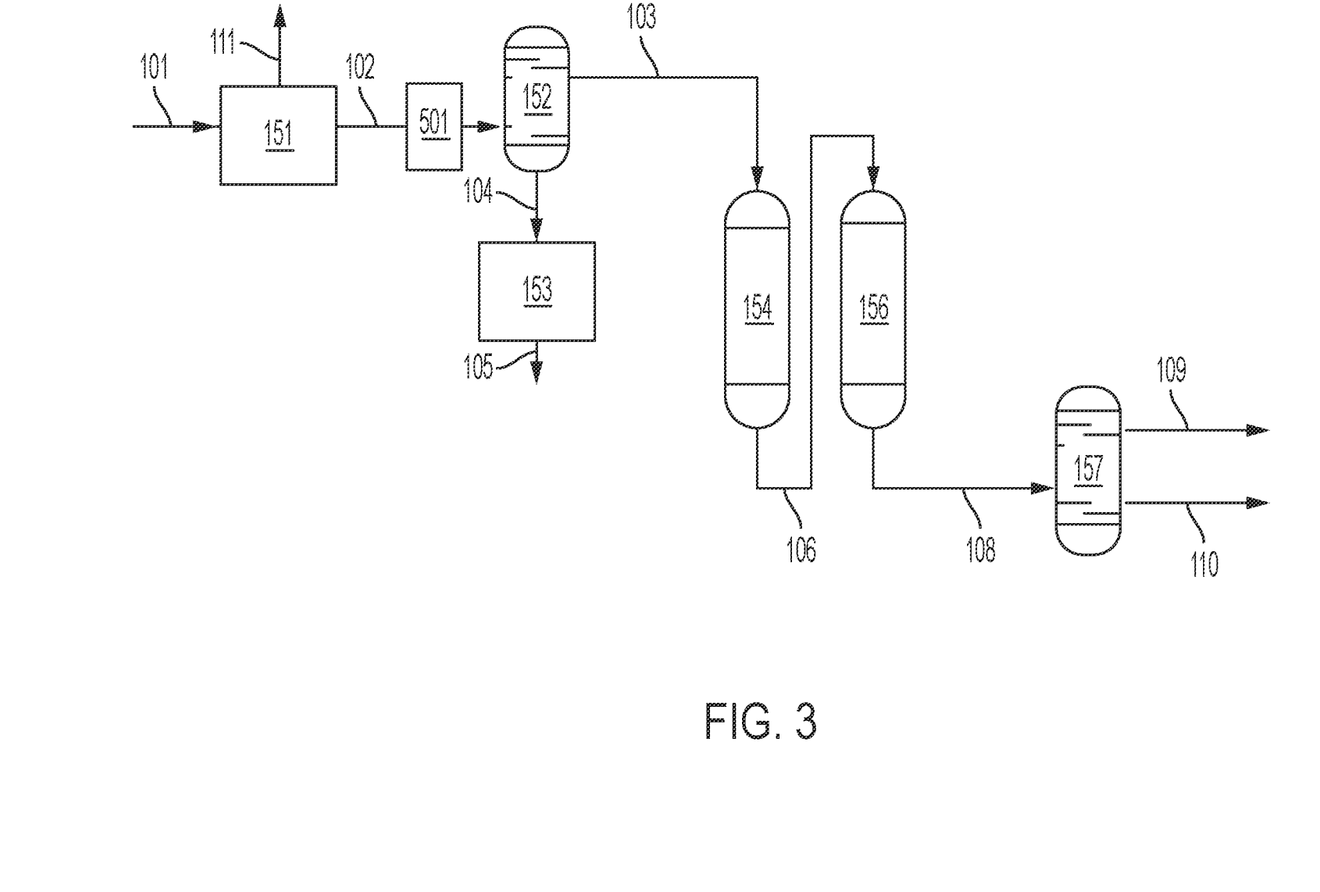
FIG. 3 is a schematic illustration of an embodiment of the present disclosure, in which product streams generated in FIG. 2 are further fractionated.

With reference to FIG. 3, in one or more embodiments, a pretreater 501 is provided to remove contaminants from the stream of plastic pyrolysis oil 102. Specifically, the pretreater 501 may remove sulfur (S), nitrogen (N), oxygen (O), chlorine (Cl), or combinations of the same from the stream of plastic pyrolysis oil 102. The pretreater 501 may be a conventional hydrotreating system configured to remove the hydrocarbons with heteroatoms. Further, dichlorination may be achieved in the pretreater 501 with ammonium chloride formed in the reaction water washed after the hydrotreating system. It is noted that water washing removes ammonium sulfide formed between hydrogen sulfide and ammonia in addition to the ammonium chloride formed.

In one or more embodiments, the pretreater 501 is positioned subsequent to the first fractionator 152 to remove contaminants from one or more of the distillate fraction 103, the plastic pyrolysis naphtha stream 203, and the plastic pyrolysis distillate stream 303 prior to introduction to the two step oligomerization operation.

Removal of contaminants is desirable as nitrogen can poison the streams, chlorine causes metallurgical issue and therefore must meet the design specification of the any processing units, and sulfur removal is desirable to meet final fuel specifications.

In one or more embodiments, the vacuum gas oil fraction 104 comprising hydrocarbons boiling above 370° C. is provided to a demetallization operation 153 to remove metallic constituents from the vacuum gas oil fraction 104 and generate a demetallized vacuum gas oil stream 105.

In one or more embodiments, the demetallization operation 153 may be catalytic hydrodemetallization. U.S. Pat. No. 8,491,779, incorporated by reference, teaches the integration of catalytic hydrodemetallization (HDM) into a refinery process. The HDM step is carried out in the presence of a catalyst and hydrogen. Further, in one or more embodiments, the hydrogen that is used can come from a downstream step. The HDM is generally carried out at 370 to 415° C. and pressure of 30 to 200 bars. Also, see U.S. Pat. No. 5,417,846, incorporated by reference, teaching HDM, as well as U.S. Pat. Nos. 4,976,848; 4,657,664; 4,166,026; and 3,891,541, all of which are incorporated by reference.

In one or more embodiments, the demetallization operation 153 may be solvent deasphalting. The process of solvent deasphalting results in the metal containing hydrocarbons of the processed streaming end up in an asphaltenes stream of a solvent deasphalting unit. U.S. Pat. No. 7,566,394, incorporated by reference, teaches details of a solvent deasphalting process.

Having described the system for processing mixed plastics into plastic pyrolysis products, it is expressly indicated that the associated method of producing pyrolysis products from a mixed plastics stream using the same is also envisioned. The method includes conducting pyrolysis of a plastic feedstock to produce a stream of plastic pyrolysis oil 102, feeding the plastic pyrolysis oil 102 to a first fractionator 152 to separate the plastic pyrolysis oil 102 into a distillate fraction 103 including hydrocarbons boiling in the range of 36 to 370° C. and a vacuum gas oil fraction 104 comprising hydrocarbons boiling above 370° C., and feeding the distillate fraction 103 to a two step oligomerization operation. The two step oligomerization operation includes feeding the distillate fraction 103 to the first hydrotreating unit 154 configured and operated to remove di-olefins by hydrogenation from the distillate fraction 103 to produce the first product stream 106 of dediolefinized plastic pyrolysis distillate and feeding the first product stream 106 to the olefin oligomerization reactor 156 configured and operated to react and combine mono-olefins in the first product stream 106 to form longer chain olefins and produce the second product stream 108 of oligomerized plastic pyrolysis distillate.

The method of producing pyrolysis products from a mixed plastics stream may also include further separating the distillate fraction into the plastic pyrolysis naphtha stream 203 and the plastic pyrolysis distillate stream 303 in the first fractionator 152. With the separate plastic pyrolysis naphtha stream 203 and plastic pyrolysis distillate stream 303, the first hydrotreating unit is split into the naphtha hydrotreating unit 254 and the plastic pyrolysis distillate hydrotreating unit 354 and the olefin oligomerization reactor 156 is split into the naphtha oligomerization reactor 256 and the plastic pyrolysis distillate oligomerization reactor 356 such that the two step oligomerization operation is split into a plastic pyrolysis naphtha oligomerization operation and a plastic pyrolysis distillate oligomerization operation.

The plastic pyrolysis naphtha hydrotreating operation includes feeding the plastic pyrolysis naphtha stream 203 to the naphtha hydrotreating unit 254 to remove di-olefins from the plastic pyrolysis naphtha stream 203 to produce the first naphtha product stream 206 of dediolefinized plastic pyrolysis naphtha and feeding the first naphtha product stream 206 to the naphtha oligomerization reactor 256 to react and combine mono-olefins from the first naphtha product stream 206 to form longer chain olefins and produce the second naphtha product stream 208 of oligomerized plastic pyrolysis naphtha.

The plastic pyrolysis distillate hydrotreating operation includes feeding the plastic pyrolysis distillate fraction 303 to the plastic pyrolysis distillate hydrotreating unit 354 to remove di-olefins from the plastic pyrolysis distillate stream 303 to produce the first plastic pyrolysis distillate product stream 306 of dediolefinized plastic pyrolysis distillate and feeding the first plastic pyrolysis distillate product stream 306 to the plastic pyrolysis distillate oligomerization reactor 356 to react and combine mono-olefins from the first plastic pyrolysis distillate product stream 306 to form longer chain olefins and produce the second plastic pyrolysis distillate product stream 308 of oligomerized plastic pyrolysis distillate.

In one or more embodiments, the system for processing of mixed plastics into plastic pyrolysis products may be integrated with a conventional refinery and other refining processes. For purposes of this disclosure a conventional refinery is meant as to reference an existing refining operation for processing crude oil into a plurality of useful products.

In one or more embodiments, the gasoline blending stream 109 is mixed with a gasoline output stream from a conventional refinery. Similarly, in one or more embodiments, the distillate blending stream 110 is combined with a diesel output stream from a conventional refinery. It will be appreciated that in one or more embodiments, both the gasoline blending stream 109 and the distillate blending stream 110 are respectively mixed with the gasoline output stream and the diesel output stream from a conventional refinery. Mixing the gasoline blending stream 109, the distillate blending stream 110, or both with gasoline and diesel output streams generated in a conventional refinery allows for tuning of the composition of gasoline and diesel output streams as well as expanding the volume of such useful streams.

Further, in one or more embodiments with the parallel two step oligomerization units which process the plastic pyrolysis naphtha stream and the plastic pyrolysis distillate stream separately, the second naphtha product stream 208 of oligomerized plastic pyrolysis naphtha is mixed with a gasoline output stream from a conventional refinery. Similarly, in one or more embodiments, second plastic pyrolysis distillate product stream 308 of oligomerized plastic pyrolysis distillate is combined with a diesel output stream from a conventional refinery. It will be appreciated that in one or more embodiments, both the second naphtha product stream 208 and the second plastic pyrolysis distillate product stream 308 are respectively mixed with the gasoline output stream and the diesel output stream from a conventional refinery. It will further be appreciated that in embodiments with the third fractionator 158 and fourth fractionator 159, the naphtha gasoline product stream 209 may be mixed with the gasoline output stream from the conventional refinery and the naphtha distillate product stream 210 and the light diesel product stream may be mixed with the diesel output stream from the conventional refinery. As previously indicated, mixing the second naphtha product stream 208, the second plastic pyrolysis distillate product stream 308, or both with gasoline and diesel output streams generated in a conventional refinery allows for tuning of the composition of gasoline and diesel output streams as well as expanding the volume of such useful streams.

The product streams of the system for processing of mixed plastics into plastic pyrolysis products may additionally or alternatively be provided to a cracking unit to produce light olefins. For example, one or more of the gasoline blending stream 109 and the distillate blending stream 110 or the second naphtha product stream 208 and the second plastic pyrolysis distillate product stream 308 may be provided to a fluidized catalytic cracking (FCC) or interconversion unit to produce light olefins such as ethylene, propylene, and butylenes. For purposes of the present disclosure a light olefin is considered $C_2$-$C_4$ olefins such as ethylene, propylene, and butylenes.

The versatility in routing of the product streams of the system for processing of mixed plastics into plastic pyrolysis products allows for flexibility in the processing of such streams in response to needs and market demands. For example, the product streams may be blended with gasoline and diesel products when demand for such fuels is high or a refinery is actively generating such streams or provided to cracking units for generation of light olefins when demand for light olefins is greater.

In one or more embodiments, integration with the conventional refinery may further include providing the demetallized vacuum gas oil stream 105 to one or more of a vacuum gas oil hydrotreating unit, a hydrocracking unit, and a residue hydroprocessing unit provided in the conventional refinery. Details of such systems are not provided for conciseness, but are known to those skilled in the art.

In one or more embodiments, integration with the conventional refinery may further include providing the vacuum gas oil fraction 104 from the first fractionator 152 directly to one or more of a delayed coking unit, a gasification unit, and a solvent deasphalting unit provided in the conventional refinery without preprocessing in the demetallization operation 153. Details of such systems are not provided for conciseness, but are known to those skilled in the art.

EXAMPLES

The following examples illustrate features of the present disclosure but are not intended to limit the scope of the disclosure.

To demonstrate the utility of the methods of producing pyrolysis products from a mixed plastics stream in accordance with the present disclosure representative testing was completed. Specifically, a gasoline blending stream 109 and a distillate blending stream 110 were generated in accordance with embodiments of the present disclosure.

A plastic feed comprising a mixture of HDPE, LDPE, PP, LLDPE, PS, and PET was provided to a plastic pyrolysis unit 151 and processed to generate a stream of plastic pyrolysis oil 102. The properties and composition of the plastic pyrolysis oil 102 are shown in Table 2.

TABLE 2

Example Plastic Pyrolysis Oil Composition

| Property/Composition | Unit | Value |
| --- | --- | --- |
| Density | kg/m³ | 790 |
| Chlorine | ppmw | 130 |
| Nitrogen | ppmw | 1139 |
| Sulfur | ppmw | 82 |
| Oxygen | ppmw | 1562 |
| Metals | ppmw | 65 |
| Di-olefins | W% | 9.4 |
| Mono-Olefins | W% | 50.0 |

Further, the plastic pyrolysis oil 102 was provided to a first fractionator 152 in accordance with the present disclosure and separated into a plastic pyrolysis naphtha stream 203 boiling in the range 30 to 110° C., a plastic pyrolysis distillate stream 303 boiling in the range of 110 to 370° C., and a vacuum gas oil fraction 104 including hydrocarbons boiling at 370° C. or greater. Specifically, heavy fractions boiling above 370° C. were removed from the plastic pyrolysis products as a VGO fraction by a TBP distillation with a column having 15 theoretical plates. The breakdown of naphtha, plastic pyrolysis distillate, and vacuum gas oil are provided in Table 3 and the detailed breakdown of the naphtha composition in the plastic pyrolysis oil is provided in Table 4.

TABLE 3

Example Plastic Pyrolysis Oil Composition

| Composition | Unit | Value |
| --- | --- | --- |
| Naphtha (36 - 110° C.) | W% | 14.0 |
| Second Distillate (110 - 370° C.) | W% | 75.6 |
| VGO (370° C.) | W% | 10.4 |

TABLE 4

Example Plastic Pyrolysis Oil Naphtha Composition

| C# | Iso Paraffin | N-Paraffin | Mono-Olefin | Aromatic | Di-Olefin | Total |
| --- | --- | --- | --- | --- | --- | --- |
| 5 | 9.70 | 0.09 | 0.00 | 3.92 | 0.00 | 0.71 | 14.42 |
| 6 | 9.43 | 0.56 | 0.00 | 27.71 | 4.66 | 0.49 | 42.86 |
| 7 | 15.32 | 1.83 | 0.00 | 16.63 | 8.94 | 0.00 | 42.72 |
| Total | 34.45 | 2.48 | 0.00 | 48.26 | 13.60 | 1.20 | 100.00 |

After pyrolysis and separation, di-olefins were removed from the plastic pyrolysis naphtha stream 203 in a reactor in accordance with the naphtha hydrotreating unit 254 of the present disclosure to generate the first naphtha product stream 206 of dediolefinized plastic pyrolysis naphtha. The operating conditions for the di-olefin removal step are given in Table 5. A nickel (Ni) containing catalyst, specifically a nickel on alumina catalyst, was utilized in the naphtha hydrotreating unit 254 for the di-olefin removal. The di-olefins (1.2 W %) were substantially converted to mono olefins in this selective hydrogenation step in the naphtha hydrotreating unit 254 thereby removing the di-olefins. The mono olefin content of the first naphtha product stream 206 was measured as 49.46 W %.

TABLE 5

Di-Olefin Removal Reactor Operating Conditions

| Parameter | unit | value |
| --- | --- | --- |
| Temperature | ° C. | 170 |
| Hydrogen Pressure inlet | Bar | 15 |
| WHSV | h$^{-1}$ | 2 |
| Hydrogen recycle rate | Sm³/m³ | 50 |

The dediolefinized plastic pyrolysis naphtha forming the first naphtha product stream 206 was oligomerized over a zeolite containing catalyst to generate a second naphtha product stream 208 of oligomerized plastic pyrolysis naphtha. Specifically, the mono-olefins in the first naphtha product stream 206 were oligomerized to generate high quality gasoline and distillate blending streams. Based on a modeling of operation of an oligomerization reactor operating at 230° C., a pressure of 55 bars, and a LHSV of 1 h$^{-1}$ with a ZSM-5 catalyst, the resulting theoretical composition of the second naphtha product stream 208 of oligomerized plastic pyrolysis naphtha is provided in Table 6.

TABLE 6

Oligomerized Plastic Pyrolysis Naphtha Composition

| Carbon Number | Yield (W%) |
| --- | --- |
| C5 | 7.811 |
| C6 | 22.978 |

TABLE 6-continued

Oligomerized Plastic Pyrolysis Naphtha Composition

| Carbon Number | Yield (W%) |
|---|---|
| C7 | 22.904 |
| C8 | 1.837 |
| C9 | 2.284 |
| C10 | 6.083 |
| C11 | 3.004 |
| C12 | 6.232 |
| C13 | 2.632 |
| C14 | 4.320 |
| C15 | 2.210 |
| C16 | 3.749 |
| C17 | 1.962 |
| C18 | 3.253 |
| C19 | 1.291 |
| C20 | 2.011 |
| C21 | 0.770 |
| C22 | 1.366 |
| C23 | 0.397 |
| C24 | 1.093 |
| C25 | 0.397 |
| C26 | 0.621 |
| C27 | 0.372 |
| C28 | 0.174 |
| C29 | 0.248 |

Di-olefins were also removed from the plastic pyrolysis distillate stream 303 in a reactor in accordance with the plastic pyrolysis distillate hydrotreating unit 354 of the present disclosure to generate the first plastic pyrolysis distillate product stream 306 of rediolefinized plastic pyrolysis distillate. The operating conditions for the di-olefin removal step are given in Table 4. A nickel (Ni) containing catalyst, specifically a nickel on alumina catalyst, was utilized in the plastic pyrolysis distillate hydrotreating unit 354 for the di-olefin removal. The di-olefins present in the plastic pyrolysis distillate stream 303 were converted to mono olefins in this selective hydrogenation step in the plastic pyrolysis distillate hydrotreating unit 354 thereby removing the di-olefins.

Finally, the second naphtha product stream 208 of oligomerized plastic pyrolysis naphtha and the first plastic pyrolysis distillate product stream 306 of dediolefinized plastic pyrolysis distillate were provided to a common distillation column to obtain a gasoline fraction with a hydrocarbon boiling range of 30-180° C. and a diesel fraction with a hydrocarbon boiling range of 180-370° C.

It should now be understood the various aspects of the method of producing pyrolysis products from a mixed plastics stream and associated system for processing mixed plastics into plastic pyrolysis products are described and such aspects may be utilized in conjunction with various other aspects.

According to a first aspect, a method of producing pyrolysis products from a mixed plastics stream includes (a) conducting pyrolysis of a plastic feedstock to produce a stream of plastic pyrolysis oil; (b) feeding the plastic pyrolysis oil to a first fractionator to separate the plastic pyrolysis oil into a distillate fraction including hydrocarbons boiling in the range of 36 to 370° C. and a vacuum gas oil fraction comprising hydrocarbons boiling above 370° C.; and (c) feeding the distillate fraction to a two step oligomerization operation. The two step oligomerization operation includes feeding the distillate fraction to a first hydrotreating unit configured and operated to remove di-olefins by hydrogenation from the distillate fraction to produce a first product stream of dediolefinized plastic pyrolysis distillate and then feeding the first product stream to an olefin oligomerization reactor configured and operated to react and combine mono-olefins in the first product stream to form longer chain olefins and produce a second product stream of oligomerized plastic pyrolysis distillate.

A second aspect includes the method of the first aspect in which the first fractionator further separates the distillate fraction into a plastic pyrolysis naphtha stream and a plastic pyrolysis distillate stream.

A third aspect includes the method of the second aspect in which the plastic pyrolysis naphtha stream comprises hydrocarbons boiling in the range of 36 to 110° C. and the plastic pyrolysis distillate stream comprises hydrocarbons boiling in the range of 110 to 370° C.

A fourth aspect includes the method of the second or third aspect in which the first hydrotreating unit is split into a naphtha hydrotreating unit and a plastic pyrolysis distillate hydrotreating unit and the olefin oligomerization reactor is split into a naphtha oligomerization reactor and a plastic pyrolysis distillate oligomerization reactor such that the two step oligomerization operation is split into a plastic pyrolysis naphtha oligomerization operation and a plastic pyrolysis distillate oligomerization operation. The plastic pyrolysis naphtha hydrotreating operation includes feeding the plastic pyrolysis naphtha stream to the naphtha hydrotreating unit configured and operated to remove di-olefins by hydrogenation from the plastic pyrolysis naphtha stream to produce a first naphtha product stream of dediolefinized plastic pyrolysis naphtha and feeding the first naphtha product stream to the naphtha oligomerization reactor configured and operated to react and combine mono-olefins from the first naphtha product stream to form longer chain olefins and produce a second naphtha product stream of oligomerized plastic pyrolysis naphtha. The plastic pyrolysis distillate hydrotreating operation includes feeding the plastic pyrolysis distillate fraction to the plastic pyrolysis distillate hydrotreating unit configured and operated to remove di-olefins by hydrogenation from the plastic pyrolysis distillate stream to produce a first plastic pyrolysis distillate product stream of dediolefinized plastic pyrolysis distillate and feeding the first plastic pyrolysis distillate product stream to the plastic pyrolysis distillate oligomerization reactor configured and operated to react and combine mono-olefins from the first plastic pyrolysis distillate product stream to form longer chain olefins and produce a second plastic pyrolysis distillate product stream of oligomerized plastic pyrolysis distillate.

A fifth aspect includes the method of any of the first through fourth aspects in which the plastic feedstock comprises mixed plastics of differing compositions.

A sixth aspect includes the method of any of the first through fifth aspects in which the plastic feedstock comprises two or more plastics selected from olefins, carbonates, aromatic polymers, sulfones, fluorinated hydrocarbon polymers, chlorinated hydrocarbon polymers, and acrylonitriles or two or more plastics selected from HDPE, LDPE, PP, LLDPE, PS, and PET.

A seventh aspect includes the method of any of the first through sixth aspects in which the method further comprises feeding the vacuum gas oil fraction comprising hydrocarbons boiling above 370° C. to a demetallization operation to remove metallic constituents from the vacuum gas oil fraction and generate a demetallized vacuum gas oil stream.

An eighth aspect includes the method of any of the first through seventh aspects in which the first hydrotreating unit includes a first hydrogenation catalyst, the first hydrogenation catalyst comprising a nickel catalyst on one or more of an alumina support, a silica support, and a titania support.

A ninth aspect includes the method of any of the first through seventh aspects in which the olefin oligomerization reactor includes a zeolite catalyst, the zeolite catalyst comprising from 1 wt. % to 80 wt. % zeolite.

A tenth aspect includes the method of the ninth aspect in which the zeolite is selected from FAU, BEA, MOR. MFI, sulfated zirconia, and MCM type zeolites.

An eleventh aspect includes the method of any of the first through tenth aspects in which the first hydrotreating unit is operated at a temperature of 150 to 210° C.

A twelfth aspect includes the method of any of the first through eleventh aspects in which the olefin oligomerization reactor is operated at a temperature of 80 to 300° C.

A thirteenth aspect includes the method of any of the first through twelfth aspects in which the second product stream is further provided to a second fractionator to generate a gasoline blending stream and a distillate blending stream based on fractionation at a hydrocarbon boiling point of 110 to 180° C.

A fourteenth aspect includes the method of any of the first through thirteenth aspects in which the method further comprises providing at least a portion of the second product stream to a cracking unit to generate a light olefin product stream.

A fifteenth aspect includes the method of the seventh aspect in which the method further comprises integration with a conventional refinery such that the demetallized vacuum gas oil stream is provided to one or more of a vacuum gas oil hydrotreating unit, a hydrocracking unit, and a residue hydroprocessing unit provided in the conventional refinery.

A sixteenth aspect includes the method of any of the first through fourteenth aspects in which the method further comprises integration with a conventional refinery such that the vacuum gas oil fraction from the first fractionator is directly provided to one or more of a delayed coking unit, a gasification unit, and a solvent deasphalting unit provided in the conventional refinery.

A seventeenth aspect includes the method of any of the first through sixteenth aspects in which the pyrolysis of a plastic feedstock is performed in the presence of a catalyst at a temperature of 300 to 1000° C.

According to an eighteenth aspect a system for processing mixed plastics into plastic pyrolysis products includes an inlet stream comprising mixed plastics; a plastic pyrolysis unit, the plastic pyrolysis unit in fluid communication with the inlet stream, and operable generate a stream of plastic pyrolysis oil from the inlet stream; a first fractionator, the first fractionator in fluid communication with the plastic pyrolysis unit and operable to separate the stream of plastic pyrolysis oil into a distillate fraction including hydrocarbons boiling in the range of 36 to 370° C. and a vacuum gas oil fraction comprising hydrocarbons boiling above 370° C.; a first hydrotreating unit, the first hydrotreating unit in fluid communication with the first fractionator and operable to remove di-olefins by hydrogenation from the distillate fraction provided from the first fractionator to produce a first product stream of dediolefinized plastic pyrolysis distillate; and an olefin oligomerization reactor, the olefin oligomerization reactor in fluid communication with the first hydrotreating unit and operable to react and combine mono-olefins from the first product stream provided from the first hydrotreating unit to form longer chain olefins and produce a second product stream of oligomerized plastic pyrolysis distillate.

A nineteenth aspect includes the system of the seventeenth aspect in which the first fractionator is further operable to separate the distillate fraction into a plastic pyrolysis naphtha stream comprising hydrocarbons boiling in the range of 36 to 110° C. and a plastic pyrolysis distillate stream comprising hydrocarbons boiling in the range of 110 to 370° C.

A twentieth aspect includes the system of the nineteenth aspect in which the first hydrotreating unit is split into a naphtha hydrotreating unit and a plastic pyrolysis distillate hydrotreating unit and the olefin oligomerization reactor is split into a naphtha oligomerization reactor and a plastic pyrolysis distillate oligomerization reactor. Further, the naphtha hydrotreating unit is in fluid communication with the first fractionator and operable to remove di-olefins by hydrogenation from the plastic pyrolysis naphtha stream provided from the first fractionator to produce a first naphtha product stream of dediolefinized plastic pyrolysis naphtha; the plastic pyrolysis distillate hydrotreating unit is in fluid communication with the first fractionator and operable to remove di-olefins by hydrogenation from the plastic pyrolysis distillate stream provided from the first fractionator to produce a first plastic pyrolysis distillate product stream of dediolefinized plastic pyrolysis distillate; the naphtha oligomerization reactor is in fluid communication with the naphtha hydrotreating unit and operable to react and combine mono-olefins from the first naphtha product stream provided from the naphtha hydrotreating unit to form longer chain olefins and produce a second naphtha product stream of oligomerized plastic pyrolysis naphtha; and the plastic pyrolysis distillate oligomerization reactor is in fluid communication with the plastic pyrolysis distillate hydrotreating unit and operable to react and combine mono-olefins from the first plastic pyrolysis distillate product stream provided from the plastic pyrolysis distillate hydrotreating unit to form longer chain olefins and produce a second plastic pyrolysis distillate product stream of oligomerized plastic pyrolysis distillate.

A twenty-first aspect includes the system of any of the eighteenth through twentieth aspects in which where the system further comprises a second fractionator, the second fractionator in fluid communication with the olefin oligomerization reactor and operable to separate the second product stream of oligomerized plastic pyrolysis distillate to a gasoline blending stream and a distillate blending stream based on fractionation at a hydrocarbon boiling point of 110 to 180° C.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A method of producing pyrolysis products from a mixed plastics stream, the method comprising:
   (a) conducting pyrolysis of a plastic feedstock to produce a stream of plastic pyrolysis oil;
   (b) feeding the plastic pyrolysis oil to a first fractionator to separate the plastic pyrolysis oil into a distillate fraction comprising hydrocarbons boiling in the range of 36 to 370° C. and a vacuum gas oil fraction comprising hydrocarbons boiling above 370° C.; and
   (c) feeding the distillate fraction to a two step oligomerization operation, the two step oligomerization operation comprising:
      i. feeding the distillate fraction to a first hydrotreating unit configured and operated to remove di-olefins by hydrogenation from the distillate fraction to produce a first product stream of diolefinized plastic pyrolysis distillate; and
      ii. feeding the first product stream to an olefin oligomerization reactor configured and operated to react and combine mono-olefins in the first product stream to form longer chain olefins and produce a second product stream of oligomerized plastic pyrolysis distillate.

2. The method of claim 1, where the first fractionator further separates the distillate fraction into a plastic pyrolysis naphtha stream and a plastic pyrolysis distillate stream.

3. The method of claim 2, where the plastic pyrolysis naphtha stream comprises hydrocarbons boiling in the range of 36 to 110° C. and the plastic pyrolysis distillate stream comprises hydrocarbons boiling in the range of 110 to 370° C.

4. The method of claim 2, where the first hydrotreating unit is split into a naphtha hydrotreating unit and a plastic pyrolysis distillate hydrotreating unit and the olefin oligomerization reactor is split into a naphtha oligomerization reactor and a plastic pyrolysis distillate oligomerization reactor such that the two step oligomerization operation is split into a plastic pyrolysis naphtha oligomerization operation and a plastic pyrolysis distillate oligomerization operation, where
   the plastic pyrolysis naphtha oligomerization operation comprises:
      i. feeding the plastic pyrolysis naphtha stream to the naphtha hydrotreating unit configured and operated to remove di-olefins by hydrogenation from the plastic pyrolysis naphtha stream to produce a first naphtha product stream of dediolefinized plastic pyrolysis naphtha, and
      ii. feeding the first naphtha product stream to the naphtha oligomerization reactor configured and operated to react and combine mono-olefins from the first naphtha product stream to form longer chain olefins and produce a second naphtha product stream of oligomerized plastic pyrolysis naphtha; and
   the plastic pyrolysis distillate oligomerization operation comprises:
      i. feeding the plastic pyrolysis distillate fraction to the plastic pyrolysis distillate hydrotreating unit configured and operated to remove di-olefins by hydrogenation from the plastic pyrolysis distillate stream to produce a first plastic pyrolysis distillate product stream of dediolefinized plastic pyrolysis distillate, and
      ii. feeding the first plastic pyrolysis distillate product stream to the plastic pyrolysis distillate oligomerization reactor configured and operated to react and combine mono-olefins from the first plastic pyrolysis distillate product stream to form longer chain olefins and produce a second plastic pyrolysis distillate product stream of oligomerized plastic pyrolysis distillate.

5. The method of claim 1, where the plastic feedstock comprises mixed plastics of differing compositions.

6. The method of claim 1, where the method further comprises feeding the vacuum gas oil fraction comprising hydrocarbons boiling above 370° C. to a demetallization operation to remove metallic constituents from the vacuum gas oil fraction and generate a demetallized vacuum gas oil stream.

7. The method of claim 1, where the first hydrotreating unit includes a first hydrogenation catalyst, the first hydrogenation catalyst comprising a nickel catalyst on one or more of an alumina support, a silica support, and a titania support.

8. The method of claim 1, where the olefin oligomerization reactor includes a zeolite catalyst, the zeolite catalyst comprising from 1 wt. % to 80 wt. % zeolite.

9. The method of claim 8, where the zeolite is selected from FAU, BEA, MOR, MFI, sulfated zirconia, and MCM type zeolites.

10. The method of claim 1, where the first hydrotreating unit is operated at a temperature of 150 to 210° C.

11. The method of claim 1, where the olefin oligomerization reactor is operated at a temperature of 80 to 300° C.

12. The method of claim 1, where the second product stream is further provided to a second fractionator to generate a gasoline blending stream and a distillate blending stream based on fractionation at a hydrocarbon boiling point of 110 to 180° C.

13. The method of claim 1, where the method further comprises providing at least a portion of the second product stream to a cracking unit to generate a light olefin product stream.

14. The method of claim 6, where the method further comprises integration with a conventional refinery such that the demetallized vacuum gas oil stream is provided to one or more of a vacuum gas oil hydrotreating unit, a hydrocracking unit, and a residue hydroprocessing unit provided in the conventional refinery.

15. The method of claim 1, where the method further comprises integration with a conventional refinery such that the vacuum gas oil fraction from the first fractionator is directly provided to one or more of a delayed coking unit, a gasification unit, and a solvent deasphalting unit provided in the conventional refinery.

16. The method of claim 1, where the pyrolysis of a plastic feedstock is performed in the presence of a catalyst at a temperature of 300° C. to 1000° C.

* * * * *